United States Patent
Handsaker

(10) Patent No.: US 8,888,316 B2
(45) Date of Patent: Nov. 18, 2014

(54) LENTICULAR LED LIGHT SOURCE REPLACEMENT FOR FLUORESCENT IN TROFFER

(71) Applicant: Innovative Lighting, Inc., Roland, IA (US)

(72) Inventor: Jerry Handsaker, Roland, IA (US)

(73) Assignee: Innovative Lighting, Inc., Roland, IA (US)

( * ) Notice: Subject to any disclaimer, the term of this patent is extended or adjusted under 35 U.S.C. 154(b) by 77 days.

(21) Appl. No.: 13/716,923

(22) Filed: Dec. 17, 2012

(65) Prior Publication Data

US 2013/0155670 A1 Jun. 20, 2013

Related U.S. Application Data

(60) Provisional application No. 61/578,059, filed on Dec. 20, 2011.

(51) Int. Cl.

| | |
|---|---|
| *F21V 13/02* | (2006.01) |
| *F21K 99/00* | (2010.01) |
| *F21S 8/00* | (2006.01) |
| *F21V 5/04* | (2006.01) |
| *F21V 19/00* | (2006.01) |
| *F21V 5/00* | (2006.01) |
| *F21V 15/01* | (2006.01) |
| *F21V 15/015* | (2006.01) |
| *F21Y 101/02* | (2006.01) |
| *F21Y 103/00* | (2006.01) |

(52) U.S. Cl.
CPC . *F21V 13/02* (2013.01); *F21K 9/30* (2013.01); *F21S 8/00* (2013.01); *F21V 5/045* (2013.01); *F21V 19/001* (2013.01); *F21V 5/008* (2013.01); *F21V 15/013* (2013.01); *F21V 15/015* (2013.01); *F21Y 2101/02* (2013.01); *F21Y 2103/003* (2013.01); *Y02B 20/386* (2013.01)
USPC ............... 362/223; 362/217.12; 362/217.16; 362/217.01; 362/224

(58) Field of Classification Search
CPC .............. F21K 9/30; F21S 8/00; F21V 13/02; F21V 19/001; F21V 5/008; F21Y 2101/02; Y02B 20/386
USPC ................... 362/223, 217.12, 218, 294, 231, 362/217.16, 217.01, 224
See application file for complete search history.

(56) References Cited

U.S. PATENT DOCUMENTS

| | | | | |
|---|---|---|---|---|
| 8,038,314 | B2* | 10/2011 | Ladewig | 362/217.12 |
| 8,136,965 | B2* | 3/2012 | Pickard et al. | 362/294 |
| 8,727,566 | B1 | 5/2014 | Szeto | |
| 8,740,410 | B2* | 6/2014 | Peifer et al. | 362/249.02 |
| 2012/0051041 | A1* | 3/2012 | Edmond et al. | 362/231 |
| 2014/0126195 | A1* | 5/2014 | Dixon | 362/218 |

* cited by examiner

*Primary Examiner* — Stephen F Husar
*Assistant Examiner* — James Cranson, Jr.
(74) *Attorney, Agent, or Firm* — Daniel J. Polglaze; Westman, Champlin & Koehler, P.A.

(57) ABSTRACT

A light source replacement for a fluorescent troffer light fixture utilizing light emitting diode and lens combination with the existing diffuser to produce lower contrast and evenly distributed illumination.

18 Claims, 7 Drawing Sheets

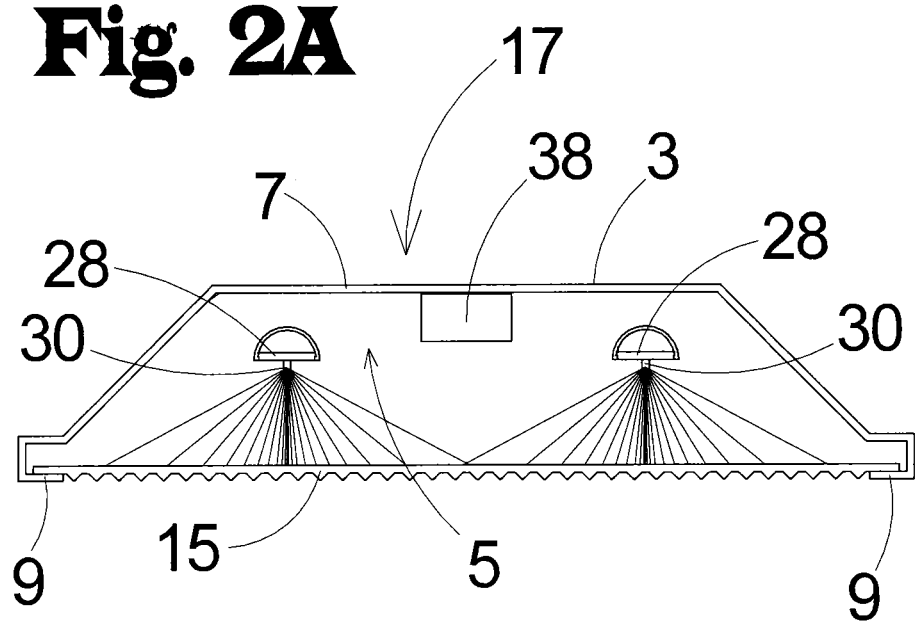
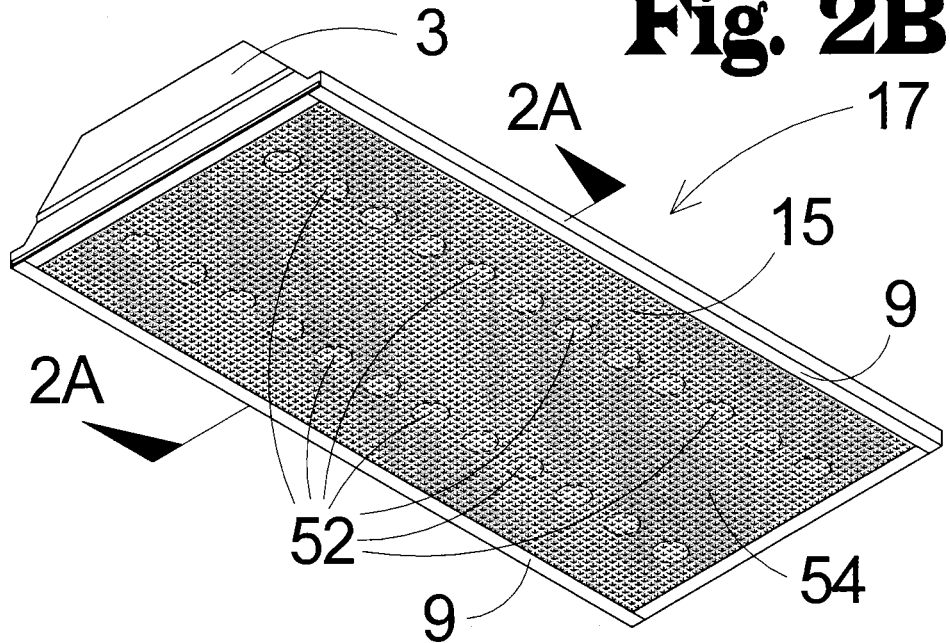

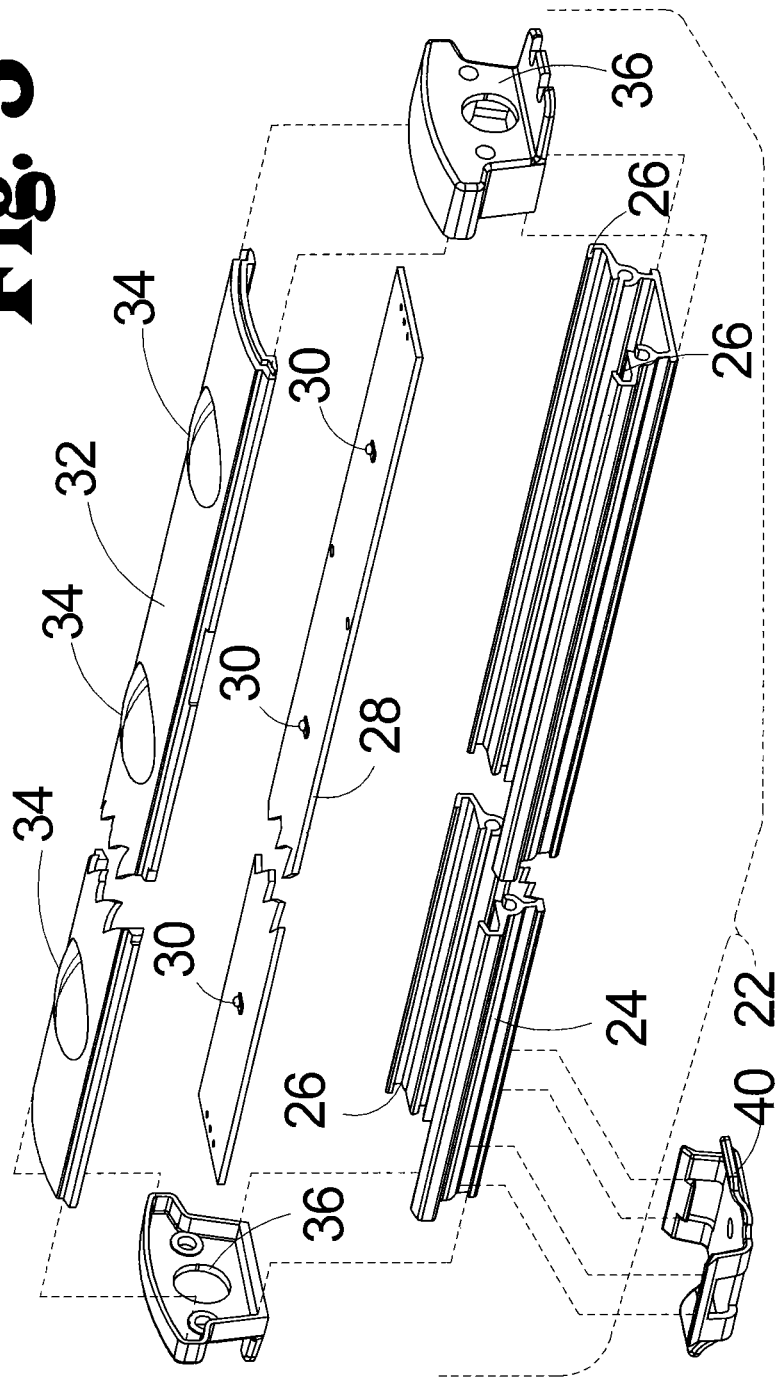

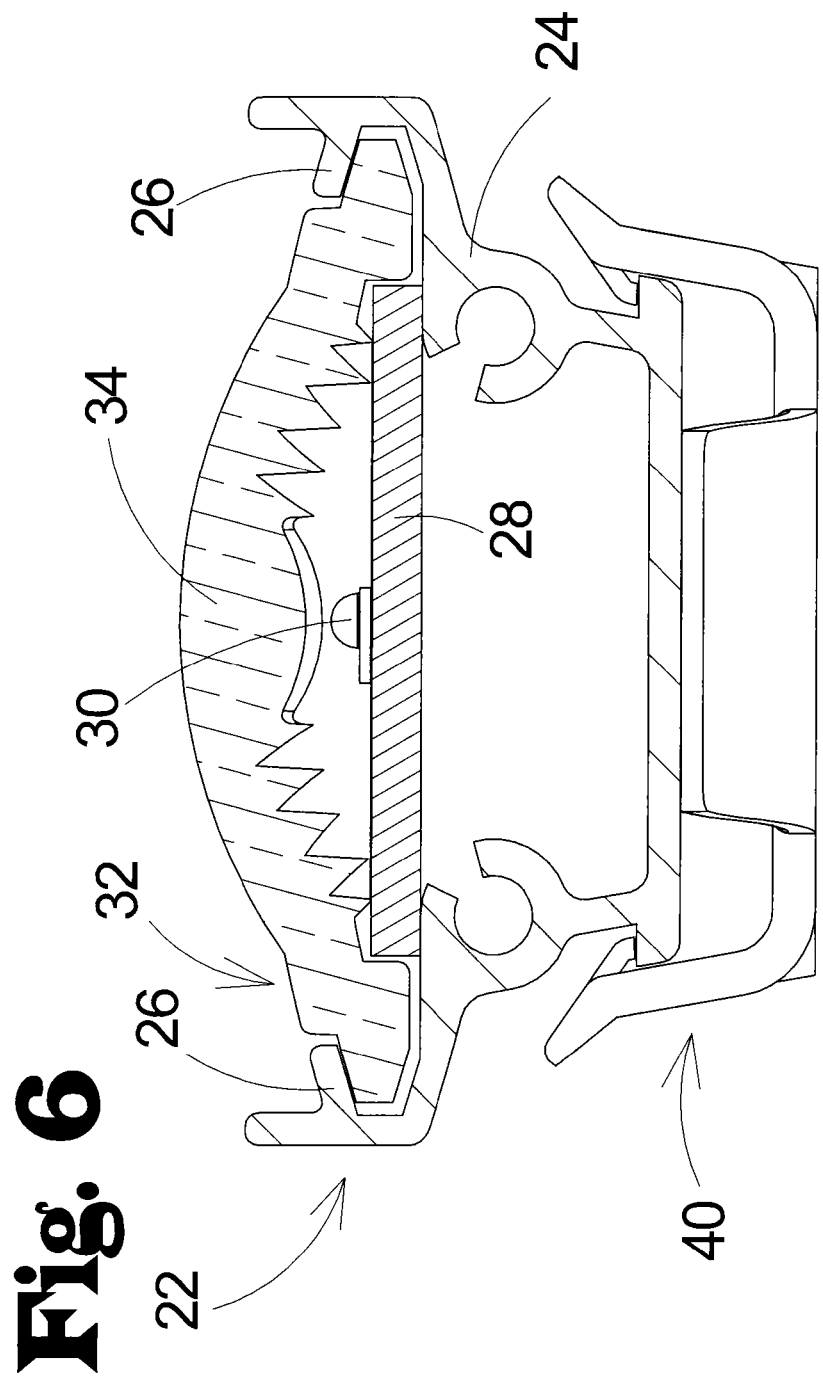

LENTICULAR LED LIGHT SOURCE REPLACEMENT FOR FLUORESCENT IN TROFFER

FIELD

The present embodiments relate to an alternate light source and light distribution means for fluorescent light source replacement within a troffer lighting fixture.

BACKGROUND

The traditional fluorescent troffer lighting fixture has through the years become a standard means for lighting interior spaces. The efficiency of fluorescent tube lighting over incandescent bulbs has been well established in the industry for decades. With the introduction of Light Emitting Diodes (LEDs), and especially high intensity LEDs, the next plateau of efficiency and convenience is presently being achieved. The power savings of LED lighting over fluorescent is well known, as are the cost benefits of a longer lasting and more reliable light source in comparison to fluorescent light, and the added benefits of a more environmentally friendly light source given the harmful levels of mercury inherent in fluorescent tubes.

It is obvious that LED light sources will eventually replace fluorescent tubes for most interior lighting, and as the fluorescent troffer is one of the most common light fixtures employing the use of linear fluorescent tubes, it is clear that the use of the existing fixture will be an efficient and cost effective structure to accommodate the new light source.

The problem that faces most replacement schemes is the characteristic differences between the fluorescent tube light source and the LED light source. Fluorescent lighting works on the principle of excitation of a gas into a plasma state wherein the entire volume of gas contained within the tube is luminous. This effect results in a widely distributed light or glow that is characterized as soft due to the wide distribution of omni-directional radiant light. An LED produces light in an almost microscopic area and the light issues forth in a radiant pattern, giving the effect that each LED in an LED array looks like a brilliant point of light. This manner of illumination is often characterized as hard or stark. The array of high contrast light produces distinctive shadows in a pattern inverse from the array of lights which are referred to as faceted shadows. The differentiating natures of the two light sources can be easily demonstrated by observing the contrast of light visible on the diffuser of a troffer fixture and in the characteristics of their shadows. The diffuser of the troffer using fluorescent tubes would have a brighter glow along the length proximate to the tube, and produce highly dispersed, or soft shadowing, light while the diffuser of the troffer employing LEDs would have a series of bright circles of high contrast, proximate to the placement of the LEDs, and produce a pattern of faceted shadows which have been characterized as distracting for people working under them.

Therefore what is needed is an LED light source replacement for the standard fluorescent troffer fixture that retains not only the energy efficiency and the decreased environmental impact but also produces a lighting effect more in line with the fluorescent having a lower contrast at the point of the diffuser and eliminating the harsh faceting that is produced by the LED's inherent light characteristics.

SUMMARY

To meet these needs, embodiments of the present invention provide; an LED light source that is suited to be easily installed into the standard fluorescent troffer design which includes all of the well known advantages of the LED light source, such as: increased power efficiency, increased operational life span and reliability, decreased environmental impact compared with the mercury inherent in fluorescent tubes, faster start-up time in colder ambient environments, elimination of unreliable and short lived ballasts, et cetera.

This light source when used in conjunction with a lens, or what is known as a lenticular LED combination, will be able to distribute the light on to the diffuser in a manner to diminish the high contrast light pattern on a wider or more distributed area of the diffuser and decrease the faceting effect by creating a more dispersed or softer light than the use of LEDs and a diffuser without a distributing lens.

One aspect of embodiments of the present invention is that a multitude of lenses are available to produce a wide variety of lighting effects, which can produce a variety of aesthetic results desirable to the user.

Another beneficial aspect of embodiments of the present invention is that the placement of the LED module within the troffer can further augment the light output pattern to increase the desired lighting effects. For example, by increasing the focal distance between the lenticular LED and the diffuser, the light from a single LED can be distributed over a larger area of the diffuser and imbricates over the other LED outputs so as to create a pattern so interfused that little to no contrast is observable on the diffuser, thus creating a very soft lighting effect, similar to the fluorescent light source.

Yet another aspect of embodiments of the present invention is that the embodiments are not limited to a single lens or lens type so that a variety of effects, including, but not limited to; output pattern, color, polarization, or even prismatic effects are possible given the preferred aesthetic desire.

Further advantages of the embodiments, along with the various features of novelty which characterize the invention, are pointed out with particularity in the claims annexed to and forming a part of this disclosure. For a better understanding of the disclosure, its operating advantages and the specific objects attained by its uses, reference should be made to the accompanying drawings and descriptive matter in which there are illustrated various embodiments of the invention.

BRIEF DESCRIPTION OF THE DRAWINGS

The embodiments will be better understood when consideration is given to the following detailed description thereof. Such description makes reference to the annexed drawings wherein:

FIG. 2A is a cross-sectional view of an LED troffer fixture demonstrating interior light distribution.

FIG. 2B is a perspective view of an LED troffer fixture demonstrating the contrast pattern projected on the diffuser.

FIG. 5 is an exploded view of an LED module of an embodiment of the present invention.

FIG. 6 is a cross-sectional view of a LED module of the present invention.

DETAILED DESCRIPTION

In the following detailed description, reference is made to the accompanying drawings which form a part hereof, and in which is shown by way of illustration specific embodiments in which the invention may be practiced. These embodiments are described in detail sufficient to enable those skilled in the art to practice the invention, and it is to be understood that other embodiments may be utilized and that structural, logical and mechanical changes may be made without departing from the scope of the present disclosure. The following detailed description is, therefore, not to be taken in a limiting sense, and the scope of the present disclosure is defined by the appended claims.

Figure 1A:
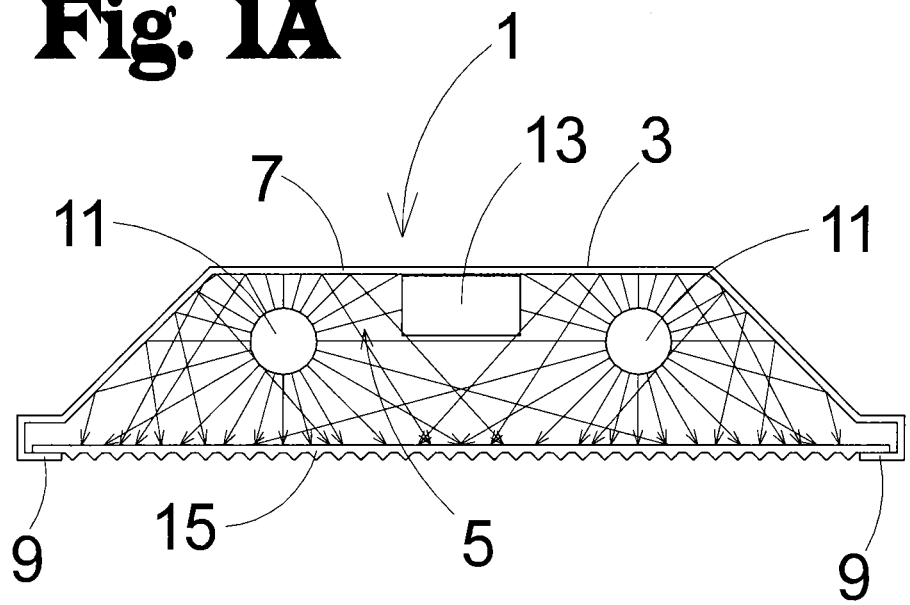
FIG. 1A is a cross-sectional view of a fluorescent troffer fixture demonstrating interior light distribution.

FIG. 1A depicts a cross section of a typical fluorescent troffer fixture (1). Troffer (3), which gets its name from a combination of trough (5) and coffer, is merely the box like fixture used to mount fluorescent tubes (11). The trough (5) is the concavity formed by the sides and ends of the troffer (3). The back plate (7) of the troffer (3) is commonly used to attach the ballast (13) which is mounted within the trough of the troffer and is a necessary element of fluorescent lighting. The back plate (7) is sometime used as a base to mount the troffer (3) directly to the ceiling, or to other mounting means such as wires, a decorative box, or stanchion/s, but it is much more common for the troffer (3) to be recessed within the ceiling so that the diffuser (15) is coplanar with the ceiling surface.

The shape of the interior of the troffer (3) or trough (5) is usually angled so as to direct light produced in the fluorescent tube (11) toward the diffuser (15). The diffuser (15) is removably attached to the troffer (3) by one of a variety of means including but not limited to clips, hinges, hooks, screws and the like. One embodiment utilizes a pair of retaining flanges (9) into which the diffuser (15) is inserted. The diffuser (15) comprises a sheet of transparent material such as glass, polycarbonate resin, such as lexan, or an acrylic plastic such as plexiglas although many other materials are known in the industry. This transparent material includes a texture that is designed to diffuse or redistribute light in a generally even distribution.

Figure 1B:
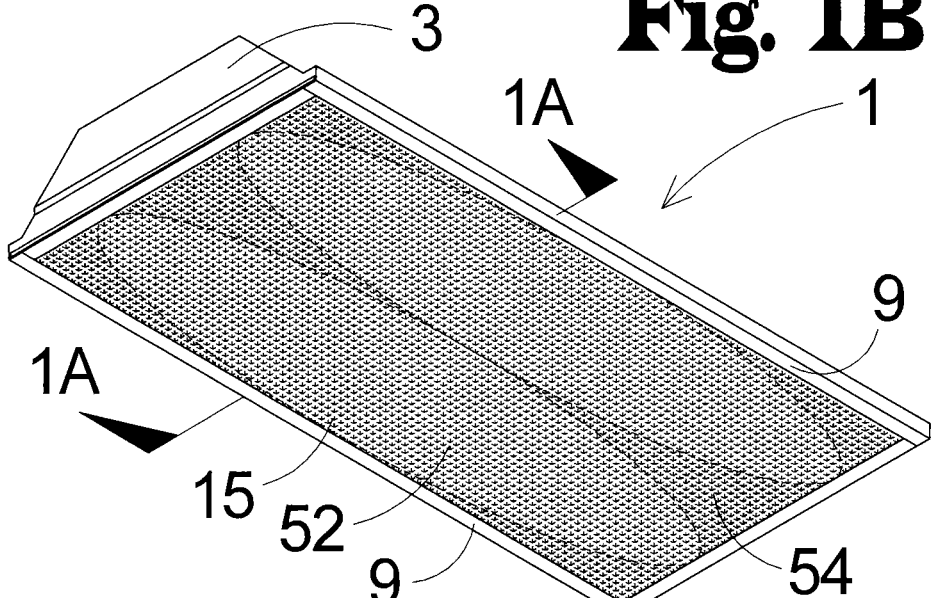
FIG. 1B is a perspective view of a fluorescent troffer fixture demonstrating the brightness contrast pattern projected on the diffuser.

The light generated inside a fluorescent tube (11) is generated everywhere within the entire interior volume of the fluorescent tube (11) and therefore is radiated widely within the troffer (3) even before passing through the diffuser (15). This wide distribution of light from the source coupled with the light reflected from the interior of the troffer (3) creates a pattern on the diffuser (15) with little contrast between bright areas (52) and less bright areas (54) as is noticeable in FIG. 1B. The combination of the light being well distributed, its low contrast light pattern on the diffuser (15) and the even distribution of light after passing through the diffuser (15), creates a very even or soft lighting effect and well dispersed shadows.

In FIG. 2A an LED troffer fixture (17) is depicted similar to FIG. 1A and comparable to LED troffer replacement solutions currently on the market, the ballast (13) has been replaced with a transformer (38) and the fluorescent tube (11) has been replaced with an apparatus that fits within the fluorescent tube's electrical and supportive mounts. This apparatus includes a printed circuit board PCB (28) and a series of light emitting diodes LEDs (30) mounted thereto. The LEDs (30) may be of the normal variety or be high intensity LEDs (30). The light output characteristic of an LED (30) is very directional, outputting the majority of its light perpendicular to its base which is mounted to the PCB (28). The light generated by such an arrangement would direct a concentrated cone from each LED (30) onto the diffuser (15) as depicted in FIG. 2B. The pattern would have a very high contrast between the bright areas (52) and the less bright areas (54). Even after passing through the diffuser the light distribution creates a pattern of shadows in an inverse relationship to the pattern on the diffuser (15) or what is known as faceting. The very directional or hard nature of the light generated from an LED (30) tends to create a very sharp and distinct faceted shadow pattern which has been characterized as distracting, or aesthetically unpleasant, compared to the soft glow of fluorescent lighting. It is known that the LEDs (30) can be mounted on the PCB (28) at various angles so as to change the pattern on the diffuser (15) but the effect of the creating faceted shadows, albeit in a different pattern, are still a problem.

Figure 3A:
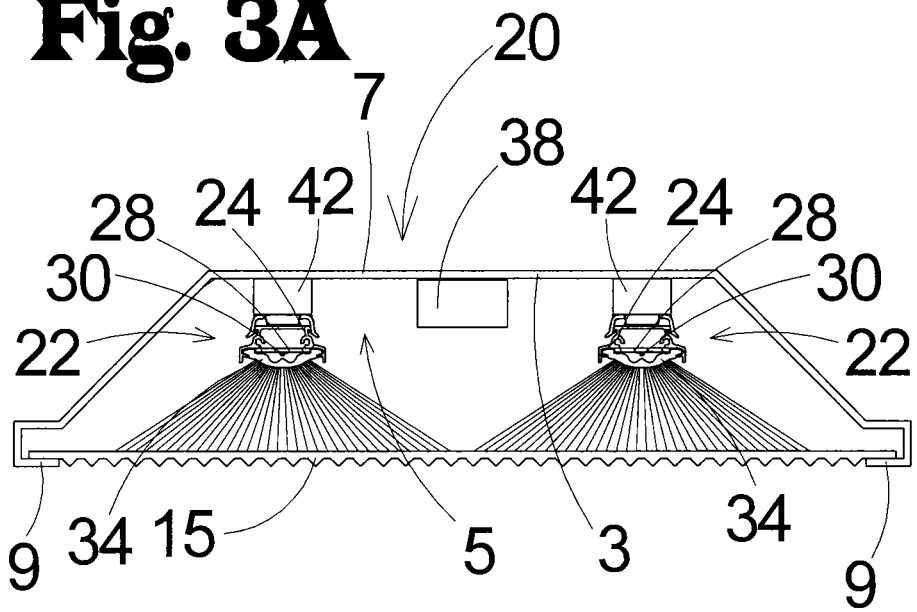
FIG. 3A is a cross-sectional view of a lenticular LED troffer of an embodiment of the present invention, demonstrating interior light distribution.

FIG. 3A illustrates an embodiment of the present invention. Similar to FIG. 2A the ballast (13) has been replaced with a transformer (38) and the fluorescent tube (11) has been replaced with an LED module (22). The LED module (22) is not mounted to the fluorescent tube's (11) electrical and supportive mounts but rather is in one embodiment mounted to the back plate (7) of the troffer (3) either directly or by way of a spacer (42). The LED module comprises in one embodiment a module base (24), a PCB (28) including one or more LEDs (30) and a lens (34) which may be mounted within a bezel (32) (shown in greater detail in FIG. 4).

The lens (34) depicted in FIG. 3A is shown changing, by refracting, the light output from the LED (30), into a flatter cone shape which is more evenly distributed compared to the light output of the LED (30) without the lens (34). This wider cone output results in the light pattern demonstrated in FIG. 3B wherein larger overlapping circles of bright areas (52) allocate the light of the LEDs (30) over a wider area of the diffuser (15), decreasing the contrast between the bright areas (52) and the less bright areas (54) and producing light closer to the glow of the original fluorescent tube (11).

Figure 3B:
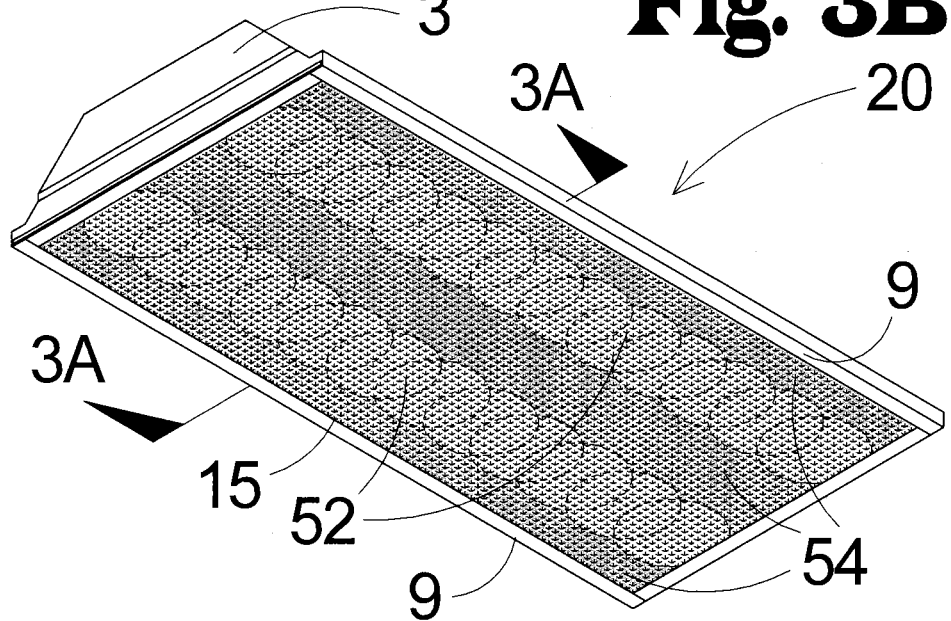
FIG. 3B is a perspective view of a lenticular LED troffer of an embodiment of the present invention, demonstrating the contrast pattern projected on the diffuser.

As may be seen from FIGS. 3A and 3B, if the spacer (42) were thinner or eliminated completely, the light output pattern of the lens (34) on the diffuser (15) produces even larger circles, allocating the light over an even larger area and further decreasing the contrast between the bright areas (52) and the less bright areas (54).

Figure 4:
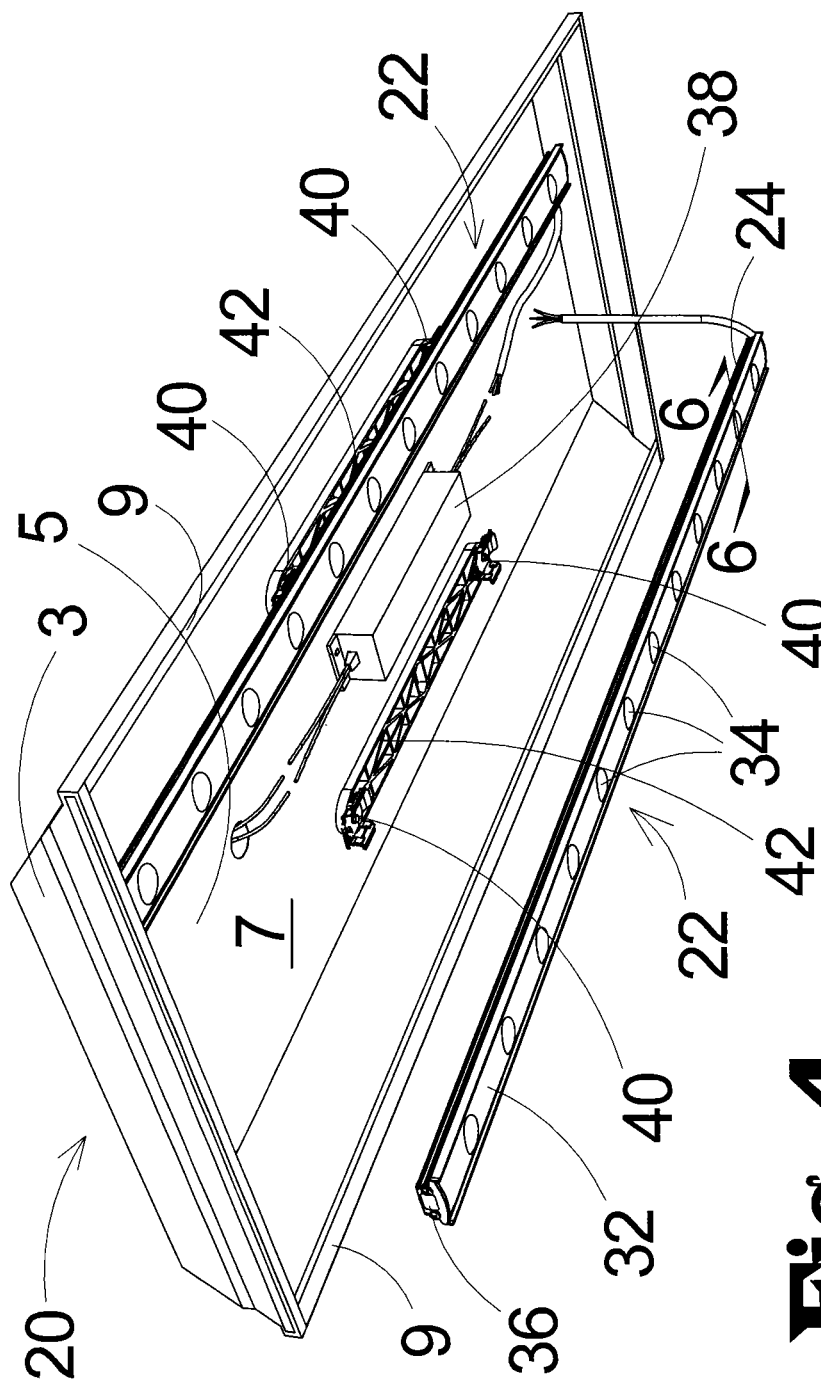
FIG. 4 is an exploded view of a lenticular LED troffer excluding the diffuser, of an embodiment of the present invention.

FIG. 4 illustrates one embodiment of a configuration of the elements of the Lenticular LED troffer fixture (20), excluding the diffuser (15), within the trough (5) of the troffer (3). The transformer (38) is secured to the center of the back plate (7) with screws using the same holes as the ballast (13) had utilized although other means for attachment are within the scope of the disclosure. On either side of the transformer a pair of spacers (42) has also been affixed to the back plate (7) with screws. The use of self tapping sheet metal screws are foreseen as a quick and reliable secure attaching means but such methods as two way adhesive pads or even magnetic plates would be satisfactory considering that a specifically manufactured means would probably not be available in a standard troffer (3) that is being retrofitted. At the proximal ends of the spacers (42) quick mounts (40) have been connected. In this embodiment, the quick mounts (40) take the form of a tension clip which is held in place with the same screw that secures the spacer (42) to the back plate (7). This quick mount (40) is designed to grip the module base (22) and can be easily engaged or disengaged from the LED module (22) for convenient installation. Other methods for mounting the LED module (22) to the spacer (42) or directly to the back plate (7) are well within the scope of one skilled in the art.

FIG. 5 illustrates the constituent elements of an LED module (22) of an embodiment of the present invention. The module base (24) acts as the supporting structure of the LED module but the design illustrated in the accompanying figures demonstrate additional functionalities. The module base (24) is made from a rigid material sufficient to retain, in place, the PCB (28) and bezel (32) in a relationship to provide specific optical light output configurations and allow for mounting the LED module (22) to the quick mount (40). One embodiment is fashioned from extruded aluminum as it meets the aforementioned criteria, is light weight, inexpensive to manufacture and is well suited to distribute and radiate the modicum of heat created by LEDs (30). It should be understood that a host of other materials could comprise the material of the module base (24) without departing from the scope of the disclosure. The module base design depicted in FIGS. 5 and 6 includes opposing bezel flanges (26) that provide a means for retaining the bezel (32) to the module base (24) as well as retaining the PCB (28). Other features of the module base (24) include in at least some embodiments means to connect an end cap (36) to the end of the module base (24), means to engage the quick mount (40) and/or space to pass additional electrical or signal conductors through the length of the LED module, but these features can be embodied by a plurality of mechanical agencies that are well known to those skilled in the art.

The PCB (28) in one embodiment includes those electrical conductors, connectors and electrical components necessary to power and operate the LEDs (30), which may also be mounted on the PCB (28). The PCB (28) is in one embodiment positioned on the module base in a manner that keeps the location of the LEDs (30) fixed, within the LED module.

The bezel (24) includes in one embodiment at least one lens (34), but preferably a series of lenses (34), that transforms the light output of the LED (30) to the light output configuration desired at the surface of the diffuser (15). The placement of the lens(es) (34) on the bezel (32) is in one embodiment in a specified relationship to the LEDs (30) on the PCB (28) and in accordance with their integration with the module base (24), to achieve the desired light output configuration and therefore the light pattern evident on the diffuser (15). The bezel (32) comprises, in one embodiment, a transparent material such as glass, polycarbonate resin, such as lexan, or an acrylic plastic such as plexiglas, although many other materials are known in the industry and are amenable to use with the embodiments of the disclosure. The lens (34) may be molded as an integral feature of the bezel (32) or may be a separate piece designed to attach to the bezel (32).

End caps (36) are shown in the illustrated embodiments as a utility to support various aspects of the LED module (22), for example end caps may be employed as a means to assist the bezel flanges (26) and/or bezel (32) itself, in the retention of the PCB (28) and/or bezel (32) from shifting along the length of the module base (24) and keeping the PCB (28) and bezel (32) in their specified relationship to create the desired light output configuration. The end caps (36) may also be employed to seal the interior of the LED module (22) from dust, moisture or other debris. A throughput in the end cap (36) in one embodiment allows a passage for electrical connection(s) or may include an integrated connector. The end cap (36) illustrated in FIG. 5 includes a flange as an alternative means of mounting eliminating the need for the quick mount (40). Many means of securing the end cap (36) to the module base (24) may be used without departing from the scope of the present disclosure. FIG. 5 includes, in one embodiment, holes in the end cap (36) which would allow a screw to pass through and engage portions of the module base (24).

FIG. 6 represents a cross-sectional view of a LED module (22) taken along lines 6-6 of FIG. 5, as well as a profile view of a quick mount (40) engaged to the module base (24). FIG. 6 demonstrates the retention of the PCB (28) between the bezel (32) and the module base (24) which is also retained by the bezel flange (26) of the module base (24). In this embodiment, the LED (30) is held in a specified relationship to the lens (34) in one axis by the concavity created by the lens (34) of the bezel (32), which is held in place by the structure of the module base (24) and retained by the bezel flanges (26) of the module base (24). Retention of the bezel (32) and the PCB (28) in the opposing axis may be achieved through the agency of the end caps (36) attached to both ends of the module base (26).

Figure 7A:
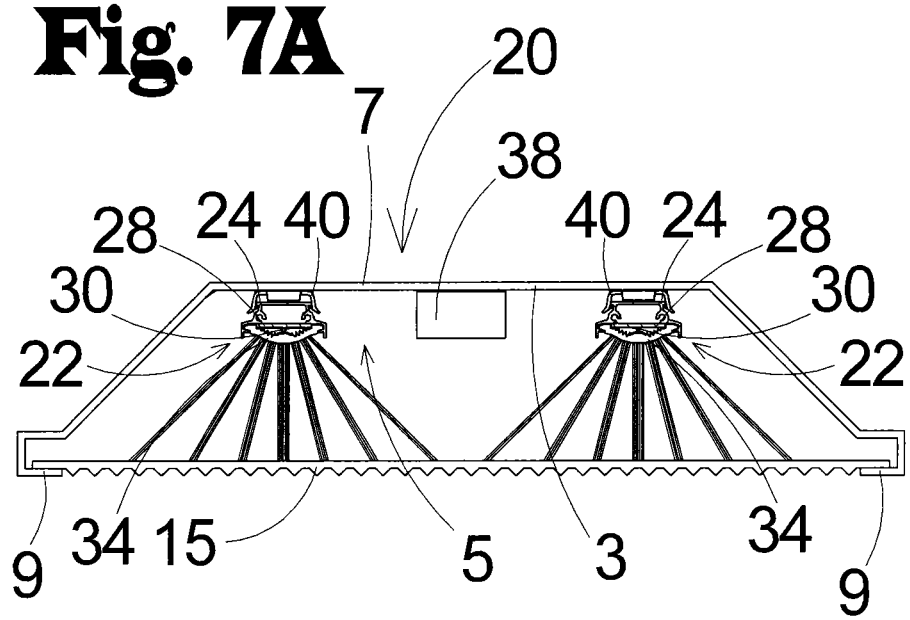
FIG. 7A is a cross-sectional view of a lenticular LED troffer of an embodiment of the present invention, demonstrating interior light distribution.
Figure 7B:
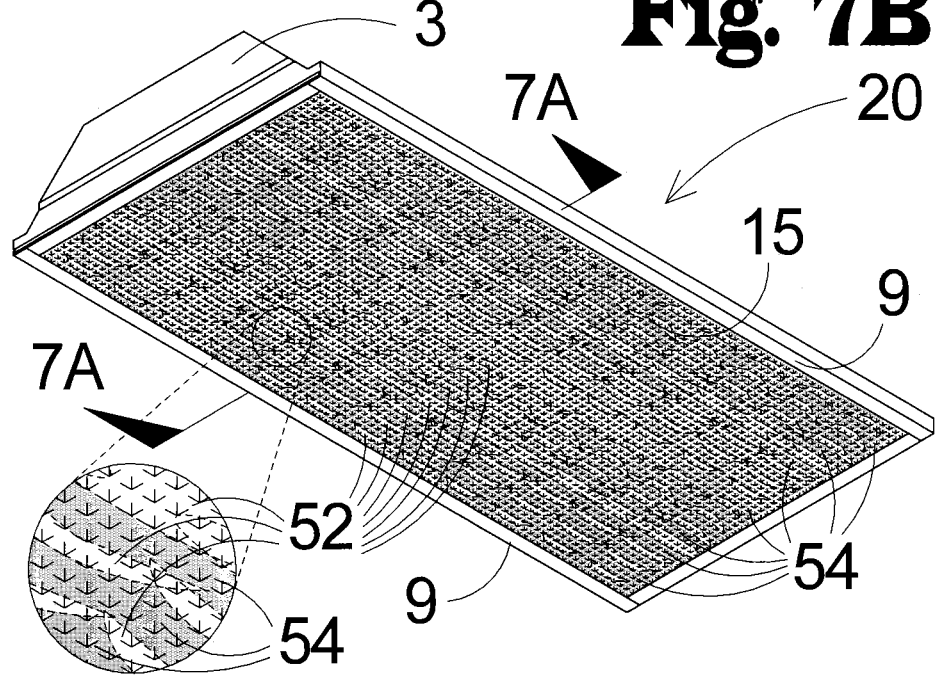
FIG. 7B is a perspective view of a lenticular LED troffer of an embodiment of the present invention, demonstrating the contrast pattern.

FIG. 7A illustrates an embodiment of the present invention similar to FIG. 3A. Unlike FIG. 3A the LED modules (22) are mounted to the back plate (7) of the troffer (3) without the use of spacers. The lens (34) depicted in FIG. 3A is shown refracting the light output from the LED (30) into a series of shafts of light which comprise a light output pattern on the diffuser (15) resembling a series of opposing crescents as depicted in FIG. 7B. The illustrated pattern of bright areas (52) and less bright areas (54) are even more uniformly distributed compared to the light output illustrated in FIG. 3B. The resulting contrast in the light pattern demonstrated in FIG. 7B is significantly diminished due to the fact that the available light from any individual LED (30) is spread out over a larger area and that overlapping of light from multiple LEDs (30) is kept to a minimum. When comparing the effect of faceting between the light produced in FIG. 3B to the light produced in FIG. 7B, the former produces a softer 12 faceted effect compared to FIG. 2B, but the light produced by FIG. 7B would have an even softer, low contrast, faceted effect wherein most of the facets are so small and indistinct that they visually blend into one another producing an effect closer to the glow of the original fluorescent tube (11).

The aesthetic quality of the geometrically ornate contrast pattern viewable on the diffuser (15) is another benefit which makes embodiments of the present invention more desirable over fluorescent troffer fixtures (1), or non-lenticular LED troffer fixtures (17).

It should be appreciated from the foregoing description and the many variations and options disclosed that, except when mutually exclusive, the features of the various embodiments described herein may be combined with features of other embodiments as desired while remaining within the intended scope of the disclosure.

It is to be understood that the above description is intended to be illustrative, and not restrictive. Many other embodiments and combinations of elements will be apparent to those skilled in the art upon reviewing the above description and accompanying drawings. The scope of the invention should, therefore, be determined with reference to the appended claims, along with the full scope of equivalents to which such claims are entitled.

| Lenticular LED Light Replacement for Fluorescent in Troffer List of Elements |
| --- |
| 1. Fluorescent Troffer Fixture |
| 2. |
| 3. Troffer |
| 4. |
| 5. Trough |
| 6. |
| 7. Back Plate |
| 8. |
| 9. Retaining Flange |
| 10. |
| 11. Fluorescent tube |
| 12. |
| 13. Ballast |
| 14. |
| 15. Diffuser |
| 16. |
| 17. LED Troffer Fixture |
| 18. |
| 19. |
| 20. Lenticular LED Troffer Fixture |
| 21. |
| 22. LED Module |
| 23. |
| 24. Module Base |
| 25. |
| 26. Bezel Flange |
| 27. |
| 28. PCB |
| 29. |
| 30. LED |
| 31. |
| 32. Bezel |
| 33. |
| 34. Lens |
| 35. |
| 36. End Cap |
| 37. |
| 38. Transformer |
| 39. |
| 40. Mount |
| 41. |
| 42. Spacer |
| 43. |
| 44. |
| 45. |
| 46. |
| 47. |
| 48. |
| 49. |
| 50. |
| 51. |
| 52. Bright Area |
| 53. |
| 54. Less Bright Area |
| 55. |
| 56. |
| 57. |
| 58. |
| 59. |
| 60. |
| 61. |
| 62. |
| 63. |
| 64. |
| 65. |
| 66. |
| 67. |
| 68. |
| 69. |
| 70. |
| 71. |
| 72. |
| 73. |
| 74. |
| 75. |
| 76. |
| 77. |
| 78. |
| 79. |
| 80. |

What is claimed is:

1. A lenticular LED troffer fixture comprising:
a troffer comprising;
a transformer;
a diffuser; and
an LED module, the LED module comprising;
a module base;
a printed circuit board having an LED; and
a bezel having a lens which changes by refraction the light output pattern of said LED;
wherein the troffer comprises a trough further comprising a back plate and wherein the LED module is attached to the back plate of the troffer within the trough.

2. The lenticular LED troffer fixture of claim 1 wherein the printed circuit board includes multiple LEDs.

3. The lenticular LED troffer fixture of claim 1 wherein the bezel includes multiple lenses.

4. The lenticular LED troffer fixture of claim 1, and further comprising a spacer that is attached to the back plate of the troffer within the trough, and wherein the LED module is attached to a spacer.

5. The lenticular LED troffer fixture of claim 4, and further comprising a quick mount, wherein the LED module is attached to a spacer that is in turn attached to the back plate of a troffer within the trough by the quick mount.

6. The lenticular LED troffer fixture of claim 1, and further comprising a quick mount, wherein the LED module is attached to back plate of the troffer within the trough by the quick mount.

7. The lenticular LED troffer fixture of claim 1 wherein multiple LED modules are contained within the trough of the troffer.

8. The lenticular LED troffer fixture of claim 1 wherein the LED and lens are held in relation to one another by the module base.

9. The lenticular LED troffer fixture of claim 8 wherein the printed circuit board is held in place by the bezel.

10. The lenticular LED troffer fixture of claim 1, and further comprising end caps of the module base, wherein the LED and lens are held in relation to one another by the module base with the assistance of end caps.

11. The lenticular LED troffer fixture of claim 10 wherein the printed circuit board is held in place by the bezel with the assistance of end caps.

12. The lenticular LED troffer fixture of claim 1, and further comprising a bezel flange of the module base to retain the bezel.

13. The lenticular LED troffer fixture of claim 1 wherein the LED comprises a high intensity LED.

14. The lenticular LED troffer fixture of claim 1 wherein the lens changes by refraction the light output of the LED to a wider distribution of light onto the diffuser.

15. A lenticular LED troffer fixture comprising:
a troffer comprising;
a transformer;
a diffuser; and
an LED module, the LED module comprising;
a module base;
a printed circuit board having an LED; and a bezel having a lens which changes by refraction the light output pattern of said LED;
wherein a distribution of light onto the diffuser consists of a large variety of small and overlapping bright areas.

16. The lenticular LED troffer fixture of claim 15 wherein the large variety of small and overlapping bright areas creates a general illumination similar to the glow of a fluorescent troffer fixture.

17. The lenticular LED troffer fixture of claim 15 wherein the light created by the LED and refracted by the lens creates a distinct pattern on the diffuser.

18. A lenticular troffer fixture comprising:
   a troffer comprising:
      a back plate;
      a trough formed by a concavity of the troffer sides; and
      a retaining flange that retains the diffuser;
   a transformer attached to the back plate within the trough;
   a diffuser that redistributes light in an even distribution;
   a pair of LED modules, each attached to the back plate within the trough, each module comprising:
      a printed circuit board having multiple LEDs;
      a bezel, including multiple lenses which change, by refraction, the light output pattern of said LEDs;
      a module base that retains the printed circuit board and bezel in a specific relation to each other; and
      a pair of end caps that assists the module base in retaining the printed circuit board and bezel in a specific relation to each other.

* * * * *